US008668615B2

United States Patent
Schmidt et al.

(10) Patent No.: US 8,668,615 B2
(45) Date of Patent: Mar. 11, 2014

(54) DRIVE ASSEMBLY WITH HYDRAULIC ACTUATING MECHANISM

(75) Inventors: Mark Schmidt, Koenigswinter (DE); Michael Schwekutsch, Wermelskirchen (DE); Colin Zaers, Koenigswinter (DE); Artur Grunwald, Nuembrecht (DE)

(73) Assignee: GKN Driveline International GmbH, Lohmar (DE)

( * ) Notice: Subject to any disclaimer, the term of this patent is extended or adjusted under 35 U.S.C. 154(b) by 260 days.

(21) Appl. No.: 13/140,734

(22) PCT Filed: Dec. 18, 2009

(86) PCT No.: PCT/EP2009/009097
§ 371 (c)(1),
(2), (4) Date: Jul. 26, 2011

(87) PCT Pub. No.: WO2010/069578
PCT Pub. Date: Jun. 24, 2010

(65) Prior Publication Data
US 2011/0275467 A1    Nov. 10, 2011

(30) Foreign Application Priority Data
Dec. 19, 2008    (DE) .......................... 10 2008 063 905

(51) Int. Cl.
*B60K 17/34*    (2006.01)
*F16H 48/30*    (2012.01)

(52) U.S. Cl.
USPC ......................................... 475/231; 475/221

(58) Field of Classification Search
CPC ............ F16H 48/08; F16H 2200/2012; F16D 48/066; F16D 2500/3024
USPC ............................. 475/231, 221; 180/249, 248
See application file for complete search history.

(56) References Cited

U.S. PATENT DOCUMENTS

| 5,161,636 | A | 11/1992 | Haupt et al. |
| 5,301,769 | A | 4/1994 | Weiss |
| 5,423,235 | A | 6/1995 | Botterill et al. |
| 6,827,663 | B2 | 12/2004 | Tucker-Peake |
| 2009/0032360 | A1* | 2/2009 | Asano ......................... 192/87.13 |

(Continued)

FOREIGN PATENT DOCUMENTS

| DE | 3913487 A1 | 11/1989 |
| DE | 102008037885 A1 | 3/2010 |

(Continued)

OTHER PUBLICATIONS

PCT International Search Report for PCT/EP2009/009097 dated Mar. 17, 2010.

(Continued)

*Primary Examiner* — Sherry Estremsky
*Assistant Examiner* — Lillian Nguyen
(74) *Attorney, Agent, or Firm* — Bejin VanOphem & Bieneman PLC

(57) ABSTRACT

A drive assembly for a motor vehicle driven by a plurality of axles includes a differential unit, an externally controllable hang-on coupling, an externally controllable locking coupling, a first hydraulic actuating unit, and a second hydraulic actuating unit. The differential unit includes an input part that is rotatably drivable around an axis of rotation, and two output parts drivingly connected to the input part. The hang-on coupling drivingly connects the differential unit and a driveshaft. The locking coupling locks the differential movement between the two output parts of the differential assembly. The first hydraulic actuating unit actuates the hang-on coupling and the second hydraulic actuating unit actuates the locking coupling. The first hydraulic actuating unit, the hang-on coupling, the second hydraulic actuating unit and the locking coupling are arranged coaxially relative to the axis of rotation.

17 Claims, 3 Drawing Sheets

(56) References Cited

U.S. PATENT DOCUMENTS

2010/0261574 A1* 10/2010 Samie et al. .................. 477/5
2012/0053002 A1* 3/2012 Schmidt et al. ............. 475/231

FOREIGN PATENT DOCUMENTS

| | | | |
|---|---|---|---|
| EP | 1795391 | A1 | 6/2007 |
| JP | 61089126 | A | 5/1986 |
| WO | WO-2006/060139 | A2 | 6/2006 |
| WO | WO-2006068607 | A1 | 6/2006 |

OTHER PUBLICATIONS

English Translation of PCT International Search Report for PCT/EP2009/009097 dated Jun. 21, 2011.

* cited by examiner

DRIVE ASSEMBLY WITH HYDRAULIC ACTUATING MECHANISM

CROSS REFERENCE TO RELATED APPLICATIONS

This application is a National Phase of International Application No. PCT/EP2009/009097, filed on Dec. 18, 2009, which claims priority to German Application No. 10 2008 063 905.2 filed on Dec. 19, 2008, which applications are hereby incorporated by reference in their entirety.

TECHNICAL FIELD

The disclosure relates to a coupling assembly for connecting a drive axle in a multi-axle driven motor vehicle. Generally, there are two different drive systems: one where a plurality of drive axles of the motor vehicle is permanently driven and one where a first drive axle is driven permanently, with a second drive axle being connected when required. Such drive systems with an optionally connectable drive axle are also referred to as hang-on or on-demand systems.

BACKGROUND

From EP 0 466 863 B1 there is known a device for connecting a driveline in a motor vehicle with a transfer case for a plurality of drivelines. One of the drivelines is permanently connected to a drive unit and a further driveline can optionally be connected to the drive unit. For connecting the driveline, there is provided an electronically actuated friction coupling which can be arranged in a transfer case or in a differential drive.

DE 10 2008 037 885.2-21 proposes a drive assembly with a hang-on coupling and a differential unit for a multi-axle driven motor vehicle. The hang-on coupling is provided in the form of a friction plate coupling which is arranged coaxially relative to the axis of rotation of the differential carrier of the differential unit.

From DE 39 13 487 A1 there is known a four-wheel drive tractor whose front axle differential and rear axle differential are driven permanently during off-road applications. In order to prevent any distortions between the front axle and the rear axle there is provided a coupling between the ring gear of the rear axle differential and the differential carrier. The coupling is ventilated via an actuating cylinder and can thus be controlled under conditions of slip. In the unpressurized condition of the actuating cylinder, the coupling is loaded by a plate spring so that torque is transmitted from the front axle in a rigid through-drive to the rear axle.

From DE 42 02 026 A1 there is known a drive assembly for controlling and distributing the driving force for a motor vehicle which comprises two driven axles. The drive assembly comprises a rear axle differential which is controlled via a first valve, a front axle differential lock which is controlled via a second valve, and an intermediate differential lock which is controlled via a third valve. Said valves are electrohydraulic valves which receive their hydraulic pressure from a pump.

SUMMARY

A drive assembly for a multi-axle driven motor vehicle is disclosed. The drive assembly comprises a differential unit with an input part which is rotatingly drivable around an axis of rotation A, and two output parts which are drivingly connected to the input part. The two output parts have a differential effect relative to one another. The drive assembly further comprises an externally controllable hang-on coupling for drivingly connecting the differential unit to a driveshaft; an externally controllable locking coupling for locking the differential movement between the two output parts of the differential unit; a first hydraulic actuating unit for actuating the hang-on coupling; and a second hydraulic actuating unit for actuating the locking coupling. The first hydraulic actuating unit, the hang-on coupling, the second hydraulic actuating unit and the locking coupling are arranged coaxially relative to the axis of rotation A.

The exemplary drive assembly is advantageous in that it permits two functions, namely additionally connecting a secondary driveline and locking the differential movement of the differential unit, and at the same time, it has a compact design. The actuation of the first hydraulic actuating unit and of the second hydraulic actuating unit can be achieved by one single pump, wherein the level of the hydraulic pressure and thus the degree of locking of the couplings is set by the pump output. The hang-on coupling and the locking coupling are closed by generating a hydraulic pressure. This is advantageous in that no energy is required for keeping the couplings open. If it is required for one of the couplings to be closed, the pump generates a hydraulic pressure which closes the hang-on coupling, respectively the locking coupling. Because the hang-on coupling and the locking coupling as well as the respective hydraulic actuating units are arranged coaxially relative to one another and relative to the axis of rotation of the differential unit, there is achieved a modular design which permits easy integration into existing installation space concepts. A further advantage of the exemplary drive assembly includes that the angle drive, by which torque is introduced from the propeller shaft into the drive assembly, is stationary when the hang-on coupling is open. In this way it is possible to avoid any splashing losses which are caused by the rotation of the ring gear around the axis of rotation, as well as friction losses in the bearings of the ring gear and of the driving pinion, more particularly as a result of pretension. This, in turn, advantageously effects the fuel consumption of the motor vehicle.

According to one exemplary embodiment, there is provided a single pump which is hydraulically connected both to the first hydraulic actuating unit and to the second hydraulic actuating unit. In this way, the number of parts of the exemplary drive assembly is reduced, which has an advantageous effect on the installation volume and the weight of the unit. In principle, the pump can have any design; for instance it can be provided in the form of a gerotor pump or a vane type pump. The pump may be driven by an electric motor which, in turn, is controlled by an electronic control unit for controlling the driving dynamics of the motor vehicle. The level of the hydraulic pressure can be variably set by the speed of the electric motor, i.e. the torque to transmitted to the drive axle is determined by the electronic control unit as a function of the vehicle condition, and the electric motor is controlled accordingly in order to actuate the hang-on coupling and the locking coupling in accordance with requirements. Depending on the output of the electric motor, the hang-on coupling and, if necessary, the locking coupling, can be controlled between an open position in which no torque is transmitted from the input part of the coupling to the output part of the coupling, and a closed position in which the coupling is fully closed and in which the input part rotates jointly with the output part. To achieve a high setting accuracy, the hydraulic system may be provided with a pressure sensor which transfers the respective data to the electronic control unit.

According to a first exemplary embodiment, the hydraulic assembly is provided with a switching valve which serves to connect the locking coupling via a respective hydraulic actuating unit. The switching valve is arranged in a connecting channel between the pump and the hydraulic actuating unit and can be switched between an open position, in which hydraulic pressure is transmitted to the second hydraulic actuating unit, and a closed position in which the hydraulic pressure supply is interrupted. In the closed condition, hydraulic pressure is transmitted only to the first hydraulic actuating unit for actuating the hang-on coupling, whereas the second hydraulic actuating unit is not loaded, and the locking coupling is open. In this switched condition, the differential unit functions as an open differential, i.e. there occurs no locking effect between the output parts. On the other hand, in the open position of the switching valve, hydraulic pressure is transmitted both to the first actuating unit for the hang-on coupling and to the second actuating unit for the locking coupling, so that torque is transmitted from the primary drive axle to the secondary drive axle and the differential unit is locked.

In this exemplary embodiment, the first hydraulic actuating unit and the second hydraulic actuating unit are supplied with the same hydraulic pressure. Thereby, a generatable coupling moment of the hang-on coupling and a generatable coupling moment of the locking coupling comprises a fixed ratio relative to one another. This ratio is substantially influenced by the ratio of the piston faces of the two hydraulic actuating units relative to one another and by the geometry and number of coupling plates of the two couplings. By controlling the pump accordingly, the required torque to be transmitted to the hang-on coupling is controlled as a function of the driving condition of the motor vehicle. If, in addition, there is required a locking function of the differential unit, the switching valve is transferred into the open position.

According to a second embodiment, there is provided a proportional valve for connecting the locking coupling by the respective hydraulic actuating unit. The proportional valve which may be arranged in a connecting channel between the pump and the second hydraulic actuating unit can be variably set between an open position in which the hydraulic pressure is transmitted to the second hydraulic actuating unit and a closed position in which the supply of hydraulic pressure is interrupted.

Due to this embodiment, the torque transmitted by the hang-on coupling can be variably set, i.e. by controlling the pump accordingly, as well as the torque to be transmitted by the locking coupling can be variably set, i.e. by respectively controlling the proportional valve. As a result, the torque is distributed, as required, to the connectable drive axle and to the individual wheels of the drive axle, so that the driving stability and driving dynamics of the vehicle are always ensured, even under changing operating conditions. If the locking function is required, the proportional valve is set accordingly, so that the locking function is suitably set by the second hydraulic actuating unit. By compressing the locking coupling, the carrier element of the differential unit, also referred to as differential carrier or differential cage, is connected in a friction-locking way to the sideshaft gear. In this way, the balancing effect of the sideshaft gears is suppressed, i.e. the differential unit is locked.

According to a third exemplary embodiment, the hydraulic assembly comprises a first proportional valve, by which the first hydraulic actuating unit for the hang-on coupling can be variably controlled, as well as a second proportional valve by which the second hydraulic actuating unit for the locking coupling can be variably controlled. "Variably controlled" in this context means that the respective proportional valve can assume any intermediate position between an open position and a closed position, so that the respective torque to be transmitted can be set accurately according to requirements.

This exemplary embodiment permits the torque to be transmitted by the hang-on coupling and also the torque to be transmitted by the locking coupling to be set by accordingly controlling the associated proportional valve. There is no need, in this case, to carry out a control operation by varying the pump output. The hang-on coupling and the locking coupling can be switched completely independently of one another, which permits a high degree of flexibility for controlling the driving dynamics of the motor vehicle. More particularly, this embodiment also permits a method of control in that when the hang-on coupling is open, the locking coupling is closed. In this way, the secondary drive axle is locked, which has a stabilizing effect when the motor vehicle is driven in a straight line.

According to an exemplary design which applies to all the above-mentioned embodiments, there is provided a further switching valve which is arranged in a connecting channel between the pump and a pressure sensor and which can be switched between an open position in which hydraulic pressure is transmitted to the first actuating unit, and a closed position in which the supply of hydraulic pressure is interrupted. In an advantageous way, said switching valve permits a reduction in the energy consumption of the pump, more particularly in the case of longer actuation periods. In the closed condition, the hydraulic line is closed, so that the hydraulic pressure in the line system can be maintained even if the pump is not running. The pump can be switched off, which has an advantageous effect on the fuel consumption. In the open position of the switching valve, the pump is again connected to the hydraulic system and generates a hydraulic pressure for loading the first, respectively the second hydraulic activating unit.

The hang-on coupling may be effectively arranged between the driveshaft and the input part of the differential unit, and the locking coupling may be effectively arranged between the input part and one of the output parts of the differential unit. To achieve a compact design, in one exemplary arrangement it is advantageous if, with reference to the central plane of the differential unit which extends through the radial axes of the differential gears, the locking coupling and the hang-on coupling are arranged on the same side. Furthermore, from the packaging point of view and to achieve a satisfactory introduction of force, in one exemplary arrangement it is advantageous if the first hydraulic actuating unit and the second hydraulic actuating unit are arranged axially between the locking coupling and the hang-on coupling. The connections for the first and for the second actuating unit are thus positioned closely together, thus achieving short line lengths.

The hang-on coupling and the locking coupling are designed in accordance with the required torque to be transmitted, and there is achieved a compact installation space if the locking coupling and the hang-on coupling comprise the same effective friction radius. It is proposed in one exemplary arrangement that the hang-on coupling can be loaded by the first hydraulic actuating unit via a first pressure plate and that the locking coupling can be loaded by the second hydraulic actuating unit via a second pressure plate, with the first and the second pressure plate, when being actuated, being loaded away from one another. The hang-on coupling and the locking coupling may be accommodated in a housing and axially supported relative thereto, which housing can be composed of a plurality of housing parts, thus ensuring that the axial forces are well supported and satisfactorily introduced into the housing when the hang-on coupling and the locking coupling are actuated.

In another exemplary embodiment, the first hydraulic actuating unit and the second hydraulic actuating unit are each provided in the form of a piston/cylinder unit. In one exemplary design, in the sense of the concept of having identical components is achieved if the piston/cylinder units are identical in design. The pistons may be provided in the form of annular pistons and arranged coaxially relative to the axis of rotation A.

According to another exemplary arrangement, the hang-on coupling is provided in the form of a friction plate coupling, wherein a first plate carrier of the hang-on coupling is at least indirectly connected to the driveshaft in a rotationally fixed way and wherein a second plate carrier of the hang-on coupling is at least indirectly connected to the input part of the differential unit in a rotationally fixed way. Providing the hang-on coupling in the form of a friction plate coupling is advantageous in that the torque to be transmitted can be variably set in accordance with requirements by controlling the first hydraulic actuating unit, and by the friction plate coupling it is possible to achieve any desirable intermediate position between an open position in which no torque is transmitted between the input part of the coupling and the output part of the coupling, and a closed position in which the coupling parts are fully closed and jointly rotate around the axis of rotation.

The locking coupling may be provided in the form of a friction plate coupling, wherein a first plate carrier of the locking coupling is at least indirectly connected to the differential carrier of the differential unit in a rotationally fixed way and wherein a second plate carrier of the locking coupling is at least indirectly connected to a sideshaft gear of the differential unit.

BRIEF DESCRIPTION OF THE DRAWINGS

Exemplary embodiments will be explained below with a reference to the drawings wherein.

DETAILED DESCRIPTION

Figure 1:
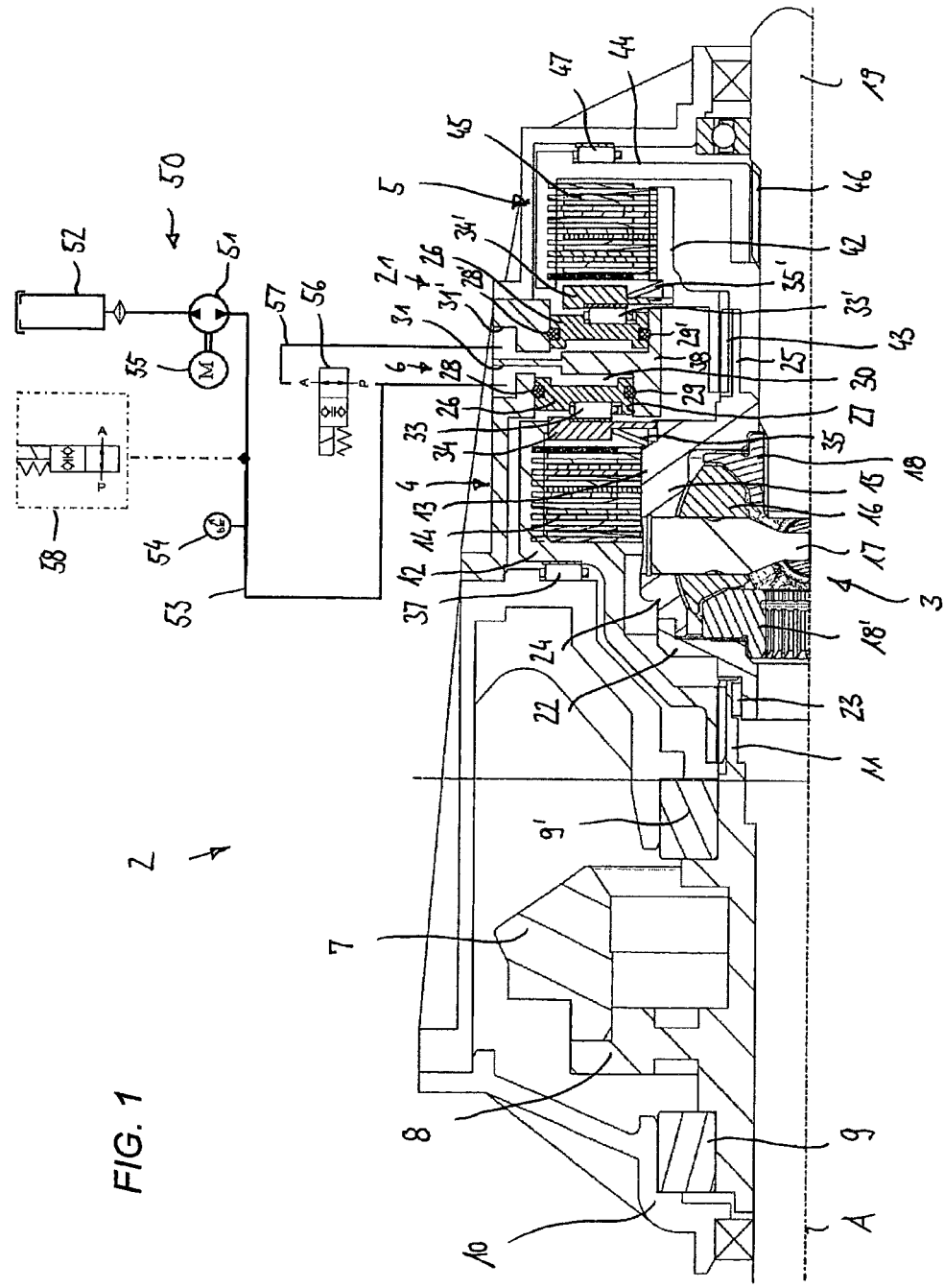
FIG. 1 shows an exemplary embodiment of a drive assembly with a hydraulic assembly in half a longitudinal section.

FIG. 1 shows an exemplary drive assembly 2 in a first embodiment. The drive assembly 2 comprises a differential unit 3, a hang-on coupling 4 which, if required, is able to connect the drive axle arranged behind same in the torque flow, a locking coupling 5 for optionally locking the differential movement of the differential unit 3, as well as a first actuating unit 6 for actuating the hang-on coupling 4, and a second actuating unit 21 for actuating the locking coupling 5.

The drive assembly comprises a ring gear 7 via which, by a pinion (not illustrated), torque can be introduced into the drive assembly 2. The ring gear 7 is firmly connected to a flange of a driveshaft 8 provided in the form of a hollow shaft and supported via bearing mechanisms 9, 9' so as to be rotatable around an axis of rotation A in the housing 10 of the drive assembly 2. At its end facing the differential unit 3, the hollow shaft 8 comprises splines 11 which engage correspondingly designed splines of a first coupling part 12 of the hang-on coupling 4 for torque transmitting purposes. The coupling part 12 is provided in the form of a coupling cage which is arranged coaxially relative to the axis of rotation A and inside which there is arranged the differential unit 3. It can be seen that the hang-on coupling 4 is provided in the form of a friction plate coupling which comprises an outer plate carrier to which there are connected outer plates in an axially displaceable and rotationally fixed way, as well as an inner plate carrier to which inner plates are connected in an axially displaceable and rotationally fixed way. The outer plates and inner plates are arranged so as to axially alternate and jointly form the plate package 14 of the hang-on coupling 4. The inner plate carrier forms the second coupling part 13 of the hang-on coupling 4, which can also be referred to as coupling output part.

The second coupling part 13 is firmly connected to a differential carrier 15 of the differential unit 3 and may be produced so as to be integral therewith. In the differential carrier 15, differential gears 16 are rotatably supported on journals 17 and jointly rotate with the differential carrier 15 around the axis of rotation A. The differential gears 16 engage sideshaft gears 18,18' which are arranged coaxially relative to the axis of rotation A and which, via abutment discs, are axially supported relative to the differential carrier 15. The sideshaft gears 18, 18' each comprise a bore with longitudinal teeth into which an associated sideshaft 19 is inserted for transmitting torque, of which only the righthand sideshaft is shown. The differential carrier 15 comprises a first carrier part 22, which, via a bearing mechanism 23, is supported relative to the hollow shaft 8 so as to be rotatable around the axis of rotation A, as well as a second carrier part 24 which is rotatably supported at the opposed end of the sideshaft 19 and comprises a sleeve projection 25. The differential carrier 15 is connected by said sleeve projection 25 to the input part of the locking coupling 5 in a rotationally fixed way.

The first hydraulic actuating unit 6 is provided in the form of a piston/cylinder unit and comprises an annular piston 26 which is axially displaceably arranged in an annular cylinder 27. The annular piston 26 and the annular cylinder 27 are arranged coaxially relative to the axis of rotation A and, respectively, to the hang-on coupling 4. The annular piston 26 is sealed relative to the outer wall and the inner wall of the cylinder by annular seals 28, 29. The annular piston 26 delimits an annular hydraulic chamber 30, i.e. when a hydraulic pressure is generated in the hydraulic chamber, the annular piston 26 is axially loaded towards the hang-on coupling 4. This leads to the plate package 14 of the hang-on coupling being compressed and, thus, to the secondary drive axle being drivingly connected to the propeller shaft. Via a passage, the hydraulic chamber 30 is connected to a connector 31 which serves to be connected to a conduit 53 of the hydraulic assembly 50.

At its end face facing away from the hydraulic chamber 30, the annular piston 26 comprises a recess in which an axial bearing 33 is arranged. The annular piston 26 is axially supported via the axial bearing 33 relative to a pressure plate 34. By axially displacing the annular piston 26, the pressure plate 34 is also displaced and axially loads the plate package 14. In this way, torque is transmitted from the first coupling part 12 to the differential carrier 15. In the fully open condition of the hang-on coupling 4, no torque at all is transmitted, so that the first coupling part 12 including the hollow shaft 8 and the ring gear 7 are stationary, whereas in the fully closed condition of the hang-on coupling, torque is transmitted from the ring gear 7 to the sideshafts 19, 19'. For supporting the axial forces which are generated during the actuation of the hang-on coupling 4, there is provided an axial bearing 37 which is axially arranged between an abutment face of the housing 10 and a supporting face of the first coupling part 12. Between the pressure plate 34 and the second coupling part 24 there is arranged a returning spring 35 which, in the unactuated condition of the actuating unit 6, returns the pressure plate 34, i.e. it axially loads same towards the hydraulic chamber 30. In the present embodiment, the returning spring is provided in the form of a plate spring, but other types of spring are also conceivable, for instance helical springs.

The locking coupling 5 comprises a first coupling part 42 which, via a splined connection 43, is connected to the differential carrier 15 in a rotational fixed way, as well as a second coupling part 44 which, via a splined connection 46, is connected to the sideshaft 19 in a rotationally fixed way. It can be seen that the locking coupling 5 is provided in the form of a friction plate coupling, with the first coupling part 42 comprising an inner plate carrier to which inner plates are connected in a rotationally fixed and axially displaceable way. The outer plates and inner plates are arranged so as to axially alternate and, together, form the plate package 45. The first coupling part 42, more particularly, comprises two sleeve portions and a flange portion connecting the two sleeve portions. The second coupling part 44, which is approximately C-shaped in a longitudinal section, is axially supported relative to the housing 10 via an axial bearing 47.

Like the first actuating unit 6, the second hydraulic actuating unit 21 is provided in the form of a piston/cylinder unit and comprises an annular piston 26' which is axially displaceably arranged in an annular cylinder 27'. The annular piston 26' and the cylinder 27' are arranged coaxially relative to the axis rotation A and to the locking coupling 5. The annular piston 26' is sealed relative to the outer wall and to the inner wall of the cylinder 27' by annular seals 28', 29'. The annular piston 26' delimits the hydraulic chamber 30', i.e. when a hydraulic pressure is generated in the hydraulic chamber 30', the annular piston 26' is axially loaded towards the locking coupling 5. Via a passage, the hydraulic chamber 30' is connected to a connecting device 31' which serves to be connected to a conduit 57 of a hydraulic assembly.

At its end face facing away from the hydraulic chamber 30', the annular piston 26' comprises a recess in which there is arranged an axial bearing 33' via which the annular piston 26' is axially supported relative to the pressure plate 34'. By axially displacing the annular piston 26', the pressure plate 34' is axially displaced, which pressure plate 34' axially loads the plate package 36. In this way, torque is transmitted from the differential carrier 15 to the sideshaft 19. In the fully open condition of the locking coupling 5, the sideshaft gears 18, 18' are able to rotate freely relative to one another; the differential unit functions as a so-called open differential. In the closed condition of the locking coupling 5, the rotational movement of the sideshaft 19 is adapted to that of the differential carrier, so that the compensating movement between the sideshaft gears 18, 18' and the sideshafts 19 connected thereto is reduced. Between the pressure plate 34' and the second coupling part 42 there is arranged a returning spring 35' which, in the unactuated condition of the actuating unit 21, returns the pressure plate 34', so that the locking coupling 5 is again ventilated. In the present exemplary embodiment, the returning spring is provided in the form of a plate spring, with other types of spring also being conceivable, such as helical springs.

The first and the second actuating units 6, 21 are axially arranged in the housing 10 between the two couplings 4, 5. An annular housing part 38 forms a separating web between the two hydraulic chambers 30, 30'. Because the two hydraulic actuating units 6, 21 are arranged so as to directly adjoin one another, there may be obtained short line paths for the hydraulic assembly.

Below, there will follow a more detailed description of the hydraulic assembly 50 of the drive assembly 2. The hydraulic assembly 50 comprises a pump 51, which is able to convey hydraulic fluid from a reservoir 52 and is thus able to generate a hydraulic pressure for actuating the first and the second actuating units 6, 21.

In the conduit 53 connecting the pump 51 to the first actuating unit 6 and, respectively, to the second actuating unit 21, there is provided a pressure sensor 54 which records the pressure in the line 53 and transmits a signal as an input value to the electronic control unit which controls the driving dynamics of the motor vehicle. The pump 51 is preferably controlled by an electric motor 55 which, in turn, is controlled by the electronic control unit. The hydraulic pressure generated by the pump 51 is set by the output of the electric motor 55, so that the required torque to be transmitted to the optionally connectable secondary drive axle can be set as a function of the driving condition of the motor vehicle.

Furthermore, the hydraulic assembly 50 comprises a switching valve 56, which serves to connect the locking coupling 5 to the respective hydraulic actuating unit 21. The switching valve 56 arranged in a connecting channel 57 can be switched in an open position in which the hydraulic pressure is transmitted to the hydraulic actuating unit 21 and in a closed position in which the hydraulic pressure supply is interrupted. In the closed position hydraulic pressure is only transmitted from the pump 51 to the first hydraulic actuating unit, whereas the second hydraulic actuating unit 21 is not loaded. In this switched condition, the locking coupling 5 is opened so that the differential unit 3 functions as an open differential, with no locking effect being generated between the sideshaft gears 18, 18'. In the open condition of the switching valve 56, hydraulic pressure is transmitted to both the first actuating unit 6 and to the second actuating unit 21, so that torque is transmitted from the primary driving axle to the secondary driving axle, and addition, the differential unit 3 is locked.

Optionally, the hydraulic assembly 50 can comprise a second switching valve 58 which would have to be arranged in the line 53 and which, in the present exemplary illustration, is shown in dashed lines. The switching valve 58 can be switched between an open position in which the hydraulic pressure is transmitted to the first actuating unit 6 as well as to the second actuating unit 21, and in a closed position in which the hydraulic pressure supply is interrupted. In the closed position, the hydraulic line 53 is closed, so that the hydraulic pressure in the line system is maintained even without an activated pump 51. The electric motor 55 and thus the pump 51 can be switched off, which has an advantageous effect on the energy consumption. This is advantageous in the exemplary case of longer actuation periods of the hang-on coupling 4 and the locking coupling 5. In the open position of the switching valve 58, the pump 51 is again connected to the hydraulic system and generates a hydraulic pressure for actuating the first and the second hydraulic actuating unit 6, 21.

In the present exemplary embodiment, the first hydraulic actuating unit 6 and the second hydraulic actuating unit 21 are loaded by the same hydraulic pressure from the pump 51, with the generatable coupling moment of the hang-on coupling 4 and the generatable coupling moment of the locking coupling being at a fixed ratio relative to one another. By controlling the pump 51 accordingly, the torque to be transmitted by the hang-on coupling 4 is controlled as a function of the driving condition of the motor vehicle in accordance with requirements. If, additionally there is required a locking function of the differential 3, the switching valve 56 is transferred into the open position.

Figure 2:
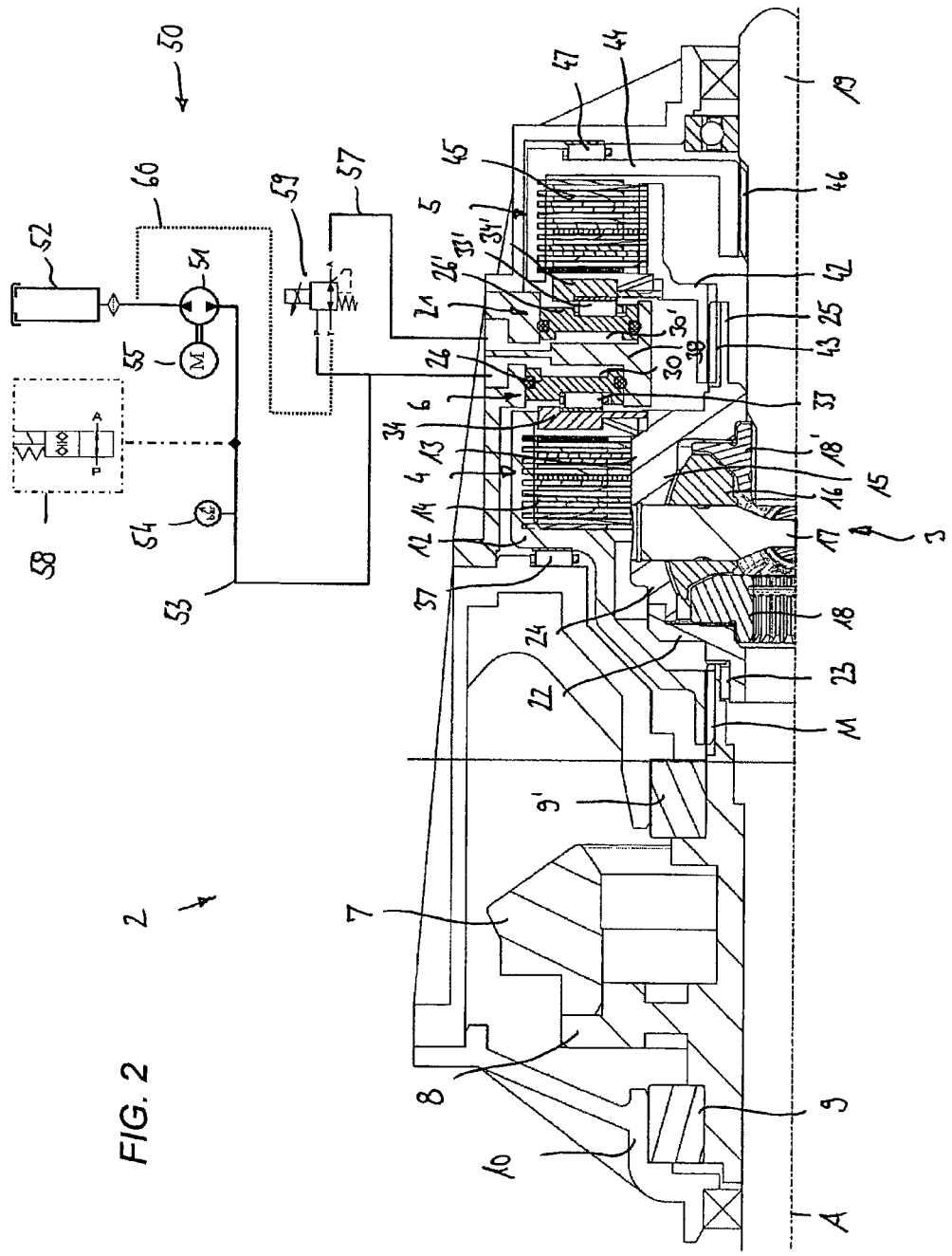
FIG. 2 shows a second exemplary embodiment of a drive assembly with a hydraulic assembly in half a longitudinal section.

FIG. 2 shows an alternative, exemplary drive assembly 2 in a second embodiment which largely corresponds to that shown in FIG. 1. To that extent, as far as common features are concerned, reference is made to the above description, with identical components or components corresponding to one another having the same reference numbers.

A special feature of the present exemplary embodiment includes, for actuating the locking coupling 5 by the hydraulic actuating unit 21, there is provided a proportional valve 59. The proportional valve 59, which is arranged in the connecting channel between the pump 51 and the connecting device 31, is variably settable between an open position, in which the hydraulic pressure is transferred to the second hydraulic actuating unit 21 and a closed position in which the hydraulic pressure supply is interrupted. Between the proportional valve 59 and the reservoir 52 there is provided a return line 60 which is shown in dashed lines.

This exemplary embodiment provides that in addition to the torque which has been transmitted by the hang-on coupling 4 and which is variably settable by controlling the pump 51 accordingly, the torque which can be transmitted by the locking coupling 5 is also variably settable by controlling accordingly the proportional valve 59. This means that the torque can be distributed to the connectable driving axle as required and that the compensating movement of the sideshafts can be reduced as required, thus permitting the driving dynamics of the motor vehicle to be accurately controlled. As in the case of the first exemplary embodiment, there is obtained the advantage of needing only one single pump for actuating the hang-on coupling 4 and the locking coupling 5.

Figure 3:
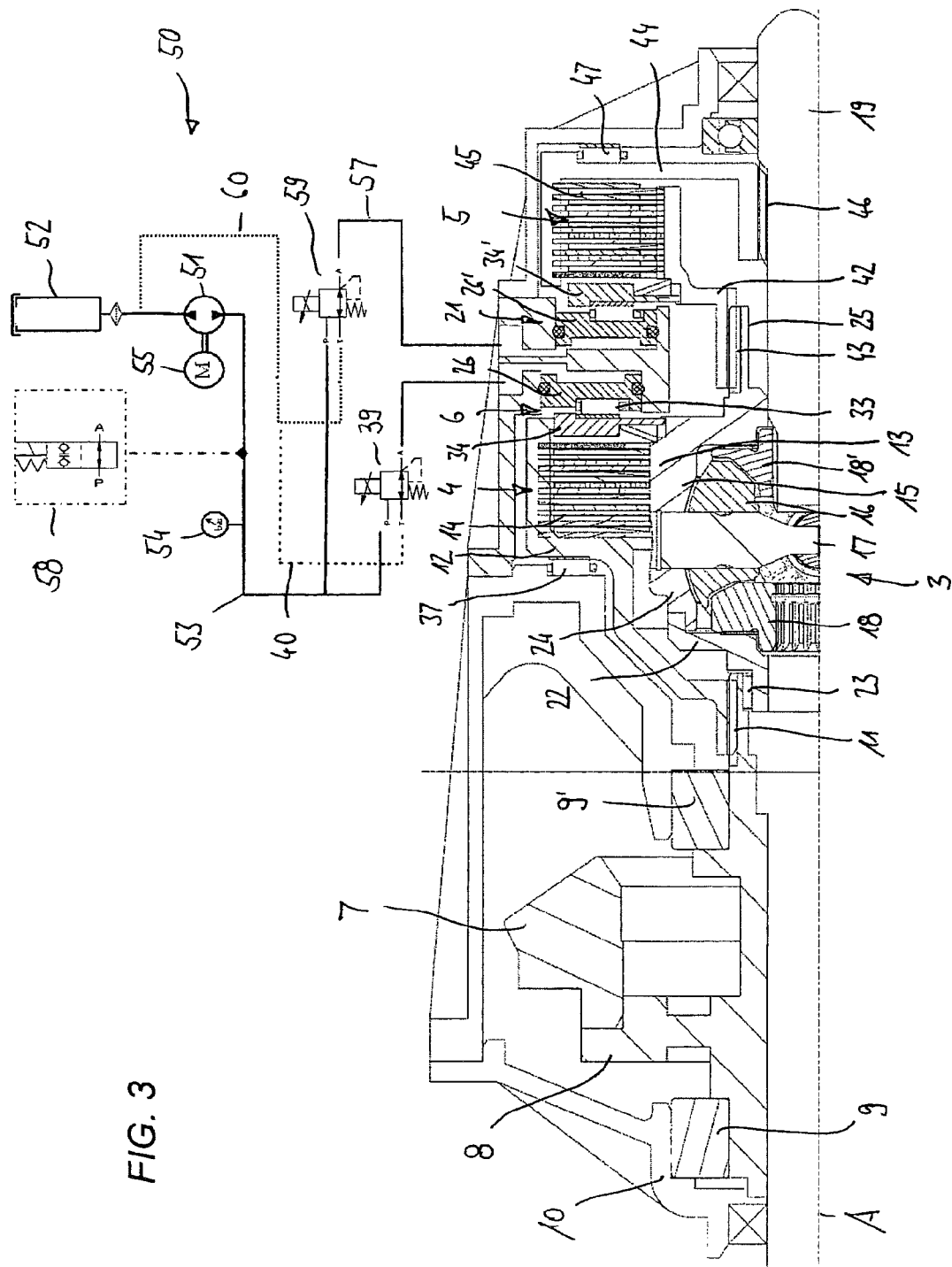
FIG. 3 shows a third exemplary embodiment of a drive assembly with a hydraulic assembly in half a longitudinal section.

FIG. 3 shows an exemplary drive assembly 2 which largely corresponds to that shown in FIG. 2. To that extent, as far as common features are concerned, reference is made to the above description, with identical components or components corresponding to one another having the same reference numbers.

The present exemplary embodiment is characterized in that the hydraulic assembly 50 comprises a first proportional valve 39 for controlling the hydraulic pressure transmitted to the first hydraulic actuating unit 6 and a second proportional valve 59 for controlling the hydraulic pressure transmitted to the second hydraulic actuating unit 21. For this purpose, the first proportional valve 39 is arranged in the connecting channel 53 between the pump 51 and the first hydraulic actuating unit 6 and can be individually controlled by the electronic control unit for the driving dynamics. Between the first proportional valve 39 and the reservoir 52 there is provided a return conduit 40 which is shown in dashed lines. The second proportional valve 59 is arranged in a connecting channel 57 between the pump 51 and the second actuating unit 21 and is also individually controlled by the electronic control unit for the driving dynamics.

With the help of the present exemplary embodiment, the hang-on coupling and the locking coupling can be actuated completely independently of one another, which permits a maximum degree of flexibility regarding the control of the driving dynamics of a motor vehicle. More particularly, this exemplary embodiment permits a type of control in the case of which the hang-on coupling is opened and the locking coupling is closed. In this way, the secondary driving axle is locked, which has a stabilizing effect on a vehicle driving in a straight line.

The above-mentioned exemplary embodiments provide the advantage of a particularly compact design. By arranging the first and the second actuating unit 6, 21 in such a way that they directly axially adjoin one another, the conduits of the hydraulic assembly 50 can be particularly short. This, in turn, has a particularly advantageous effect on the reaction behaviour of the vehicle, i.e. the setting accuracy and setting speed of the drive assembly 2. Furthermore, short conduits also ensure that the hydraulic system 50 has a substantial influence on temperature fluctuations, which, in turn, advantageously influences the setting accuracy. A further substantial advantage includes that the drive assembly 2 permits the operations of locking the differential unit 3 and of optionally connecting the secondary driving axle to take place at one driveline, with only one pump 51 being required. By arranging the hang-on coupling 4 and the locking coupling 5 including the associated actuating units at, and coaxially relative to, the differential unit 3, the disconnection of the angle drive for increasing energy efficiency and the locking function can be combined in a compact and cost-effective form.

The invention claimed is:

1. A drive assembly for a motor vehicle driven by a plurality of axles, comprising:
   a differential unit with an input part which is rotatably drivable around an axis of rotation by a driveshaft, and two output parts which are drivingly connected to the input part;
   an externally controllable hang-on coupling which is arranged between the driveshaft and the input part of the differential unit and which serves for optionally drivingly connecting the differential unit and the driveshaft, wherein the differential unit is driven by the driveshaft when the hang-on coupling is closed and non-driven when the hang-on coupling is open;
   an externally controllable locking coupling for locking a differential movement between the two output parts of the differential unit;
   a first hydraulic actuating unit for closing the hang-on coupling when a hydraulic pressure is generated;
   a second hydraulic actuating unit for actuating the locking coupling independently from the hang-on coupling;
   wherein the first hydraulic actuating unit, the hang-on coupling, the second hydraulic actuating unit and the locking coupling are arranged coaxially relative to the axis of rotation.

2. A drive assembly according to claim 1, wherein the first hydraulic actuating unit and the second hydraulic actuating unit are supplied with a same amount of hydraulic pressure.

3. A drive assembly according to claim 1, wherein there is provided a hydraulic pump which, for generating pressure, is hydraulically connected to the first hydraulic actuating unit as well as to the second hydraulic actuating unit.

4. A drive assembly according to claim 3, wherein there is provided an electric motor for driving the pump, wherein the level of the hydraulic pressure is variably settable by the rotation speed of the electric motor.

5. A drive assembly according to claim 3, wherein in a connecting channel between the pump and the second hydraulic actuating unit there is provided a switching valve which is switchable between an open position in which hydraulic pressure is transmitted to the second hydraulic actuating unit, and a closed position in which the supply of hydraulic pressure is interrupted.

6. A drive assembly according to claim 3, wherein in a connecting channel between the pump and the second hydraulic actuating unit, there is provided a proportional valve which is variably settable between an open position in which hydraulic pressure is transmitted to the second hydraulic actuating unit, and a closed position in which the supply of hydraulic pressure is interrupted.

7. A drive assembly according to claim 3, wherein in a connecting channel between the pump and the first hydraulic actuating unit there is provided a proportional valve which is variably settable between an open position in which the hydraulic pressure is transmitted to the first hydraulic actuating unit, and a closed position in which the supply of hydraulic pressure is interrupted.

8. A drive assembly according to claim 3, wherein a further switching valve is arranged in a connecting channel between the pump and the first actuating unit and is switchable between an open position in which hydraulic pressure is transmitted to the first actuating unit, and a closed position in which the supply of hydraulic pressure is interrupted.

9. A drive assembly according to claim 1, wherein a generatable coupling moment of the hang-on coupling and a generatable coupling moment of the locking coupling have a fixed ratio relative to one another.

10. A drive assembly according to claim 1, wherein the hang-on coupling is arranged between the driveshaft and the input part of the differential unit and that the locking coupling is arranged between the input part and one of the output parts of the differential unit.

11. A drive assembly according to claim 1, wherein the hang-on coupling is provided in the form of a friction plate coupling, wherein a first plate carrier of the hang-on coupling is connected in a rotationally fixed way to the driveshaft and wherein a second plate carrier of the hang-on coupling is connected in a rotationally fixed way to the input part of the differential unit.

12. A drive assembly according to claim 1, wherein, with reference to a central plane of the differential unit, the locking coupling and the hang-on coupling are arranged on the same side.

13. A drive assembly according to claim 1, wherein the first hydraulic actuating unit and the second hydraulic actuating unit are arranged axially between the locking coupling and the hang-on coupling.

14. A drive assembly according to claim 1, wherein the locking coupling and the hang-on coupling comprise approximately the same friction radius.

15. A drive assembly according to claim 1, wherein the hang-on coupling can be loaded by the first hydraulic actuating unit via a first pressure plate and that the locking coupling can be loaded by the second hydraulic actuating unit via a second pressure plate, wherein, when being actuated, the first and the second pressure plate are loaded away from one another.

16. A drive assembly according to claim 1, wherein the hang-on coupling and the locking coupling are received in a housing and are each axially supported relative to same.

17. A drive assembly according to claim 1, wherein the first hydraulic actuating unit and the second actuating unit are each provided in the form of a piston/cylinder unit.

* * * * *